United States Patent [19]

Saito

[11] 4,409,630
[45] Oct. 11, 1983

[54] INFORMATION SIGNAL RECORDING AND/OR REPRODUCING APPARATUS AND A RECORDING JACKET FOR USE THEREWITH

[75] Inventor: Etsuro Saito, Ayase, Japan

[73] Assignee: Sony Corporation, Tokyo, Japan

[21] Appl. No.: 214,737

[22] Filed: Dec. 9, 1980

[30] Foreign Application Priority Data

Dec. 29, 1979 [JP] Japan .................................. 54-171747

[51] Int. Cl.³ ...................... G11B 5/016; G11B 21/08; G11B 5/82; G11B 23/02
[52] U.S. Cl. ....................................... 360/99; 360/78; 360/133; 360/135
[58] Field of Search .................... 360/99, 133, 135, 77, 360/78, 97, 98, 137

[56] References Cited

U.S. PATENT DOCUMENTS

| | | | |
|---|---|---|---|
| 3,951,264 | 4/1976 | Heidecker | 360/135 |
| 3,981,025 | 9/1976 | Schoettle | 360/135 |
| 4,131,199 | 12/1978 | Hatchett | 360/133 |
| 4,138,703 | 2/1979 | Stave | 360/135 |
| 4,185,313 | 1/1980 | Green | 360/133 |
| 4,272,793 | 6/1981 | Van Landingham | 360/78 |
| 4,274,119 | 6/1981 | Hayward | 360/99 |

Primary Examiner—Robert M. Kilgore
Attorney, Agent, or Firm—Lewis H. Eslinger; Alvin Sinderbrand

[57] ABSTRACT

A jacket for positioning a disc-shaped magnetic recording sheet in an information signal recording and/or reproducing apparatus includes an upper plate, a lower plate which cooperates with the upper plate for sandwiching the recording sheet therebetween, and a positioning device for maintaining the upper and lower plates a substantially fixed distance apart and which may include one or more of the following: (1) ferromagnetic pieces mounted in grooves in the outer surfaces of the upper and lower plates and having upper surfaces thereof situated below the outer surfaces of the plates, the ferromagnetic pieces being magnetically attracted by electromagnets or permanent magnets in the apparatus to pull the plates apart a fixed distance; (2) inclined surfaces at the periphery of apertures in the upper and lower plates and the apparatus includes claw-like members for engaging the inclined surfaces to pull the plates apart a fixed distance; (3) openings in the upper and lower plates, for example, central openings in each of the plates and a head insertion opening in one plate and a corresponding slit-like opening situated in opposing relation in the other plate, for maintaining an air pressure balance on both sides of the recording sheet when rotated; (4) spacer members attached to the inner surface of one or both of the upper and lower plates for maintaining a fixed distance therebetween by preventing any deformation of the plates when the jacket is secured in the apparatus by upper and lower position pins.

31 Claims, 31 Drawing Figures

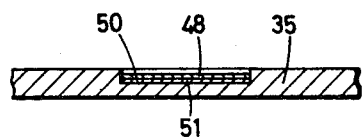
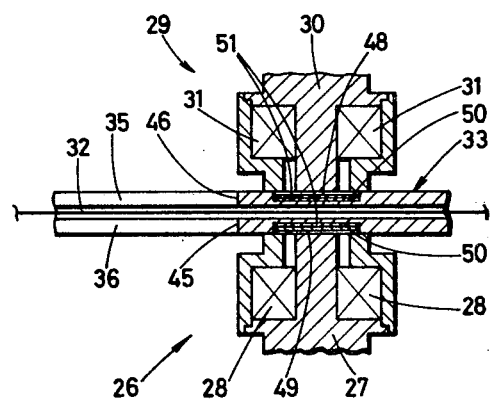
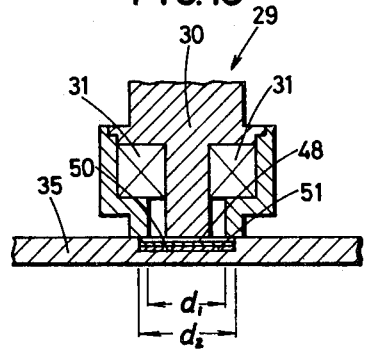

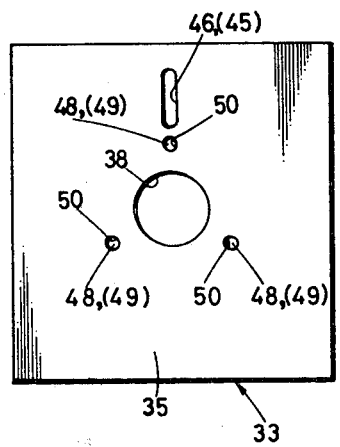
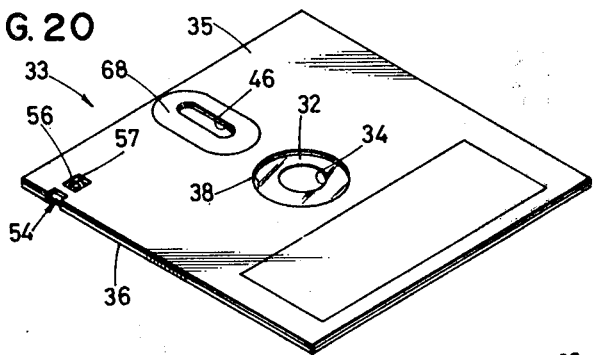
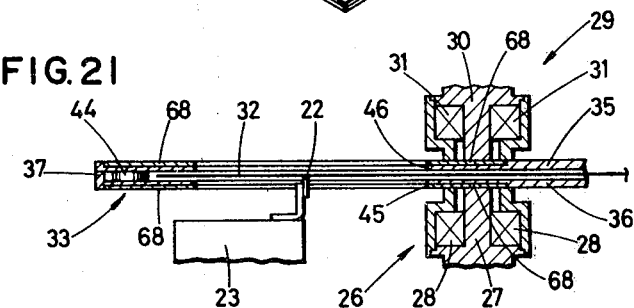

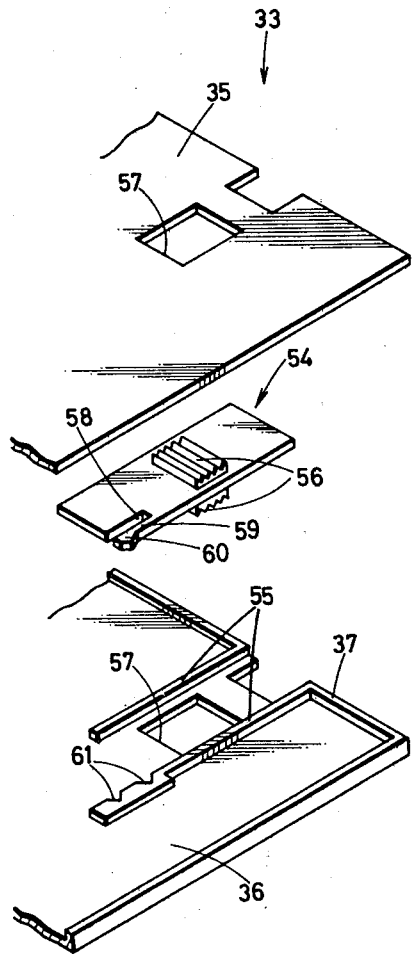
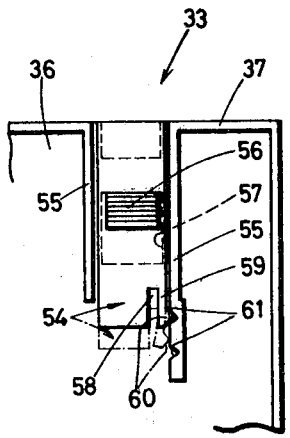
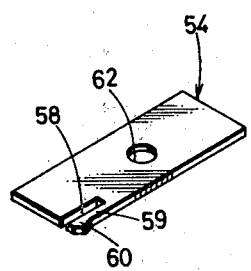

INFORMATION SIGNAL RECORDING AND/OR REPRODUCING APPARATUS AND A RECORDING JACKET FOR USE THEREWITH

BACKGROUND OF THE INVENTION

1. Field of the Invention

The present invention relates generally to an information signal recording and/or reproducing apparatus and, more particularly, is directed to an information signal recording and/or reproducing apparatus in which a magnetic disc-shaped recording sheet is adapted for rotable movement in a recording jacket which can be mounted in the apparatus and a magnetic head contacts the rotating sheet to record and/or reproduce information signals therefrom.

2. Brief Description of the Prior Art

It has previously been known to record and/or reproduce video signals from a magnetic recording medium in the form of a disc-like sheet by bringing a magnetic head into contact with the sheet while rotating the sheet at a high speed and, at the same time, moving the magnetic head in the radial direction of the sheet.

In known apparatus for recording and/or reproducing of this type, a problem often arises in which the sheet becomes damaged or fatty substances become deposited on the surfaces of the sheet as a result of direct handling by a person during insertion and removal of the sheet from the apparatus. It has thus been proposed to accommodate the magnetic sheet in a recording jacket which can be inserted in and removed from the apparatus. Generally, known recording jackets have been of a flat and thin rectangular configuration and have been supported at peripheral portions thereof when mounted in the apparatus. However, because of such configuration, it is very difficult to ensure that a constant space is provided inside the jacket in the axial direction of the magnetic sheet. Accordingly, when the flexible magnetic sheet is rotated at a high speed in such thin jacket the magnetic sheet often contacts the inner surfaces of the jacket.

OBJECTS AND SUMMARY OF THE INVENTION

Accordingly, it is an object of this invention to provide an information signal recording and/or reproducing apparatus and a recording jacket for use therewith that avoids the above-described difficulties encountered with the prior art.

More particularly, it is an object of this invention to provide an information signal recording and/or reproducing apparatus and a recording jacket for use therewith, the latter being adapted to position a magnetic sheet in the apparatus with the apparatus smoothly rotating the magnetic sheet in the jacket to thereby record and/or reproduce an information signal.

Another object of this invention is to provide an information signal recording and/or reproducing apparatus and a recording jacket for use therewith which accommodates a recording sheet therein in a space which remains substantially constant in the axial direction of rotation of the recording sheet.

Still another object of this invention is to provide an information signal recording and/or reproducing apparatus and a recording jacket for use therewith, in which air is smoothly introduced into the jacket by rotation of a recording sheet therein so as to provide an air damping effect to the recording sheet in the axial direction thereof.

In accordance with an aspect of this invention, a jacket for positioning a recording sheet in an information signal recording and/or reproducing apparatus includes an upper plate, a lower plate cooperating with the upper plate for sandwiching the recording sheet between the upper plate and the lower plate, and positioning means on at least one of the upper and lower plates for maintaining the upper plate and the lower plate a substantially fixed distance apart.

In accordance with another aspect of this invention, an information signal recording and/or reproducing apparatus is provided for transducing an information signal with respect to a recording sheet with the recording sheet being positioned within the apparatus by a jacket having an upper plate and a lower plate cooperating with the upper plate for sandwiching the recording sheet therebetween, the apparatus including transducer means for transducing an information signal with respect to the recording sheet; drive means for providing relative movement between the recording sheet and the transducer means; and holding means cooperating with positioning means on at least one of the upper and lower plates for maintaining the upper plate and the lower plate a substantially fixed distance apart.

The above, and other objects, features and advantages of the present invention, will become apparent from the following detailed description of illustrative embodiments of the invention which is to be read in connection with the accompanying drawings.

BRIEF DESCRIPTION OF THE DRAWINGS

FIG. 13 is a cross-sectional view of a portion of the recording jacket of FIG. 5, illustrating the arrangement of an iron piece in relation to the upper plate of the jacket;

FIG. 14 is an enlarged, cross-sectional view of a portion of the recording jacket of FIG. 5 and of the apparatus of FIG. 1, illustrating means for holding the upper and lower plates of the jacket a substantially fixed distance apart;

FIG. 15 is an enlarged, cross-sectional view of part of the recording jacket and apparatus of FIG. 14;

FIG. 19 is a plan view of a modification of the recording jacket of FIG. 5 in which three iron pieces are provided on each of the upper plate and the lower plate thereof;

FIG. 20 is a perspective view of a modification of the recording jacket of FIG. 5, having an attracting plate extending circumferentially about the opening for the magnetic head;

FIG. 21 is a cross-sectional view of the recording jacket of FIG. 20;

FIG. 29 is an exploded, perspective view of a portion of the recording jacket of FIG. 5, illustrating a slider mechanism for preventing inadvertent erasure of information signals from the recording sheet;

FIG. 30 is a top plan view of the slider of FIG. 29; and

FIG. 31 is a perspective view of a portion of a modified slider mechanism of the recording jacket of FIG. 5.

DETAILED DESCRIPTION OF THE PREFERRED EMBODIMENTS

Figure 1:
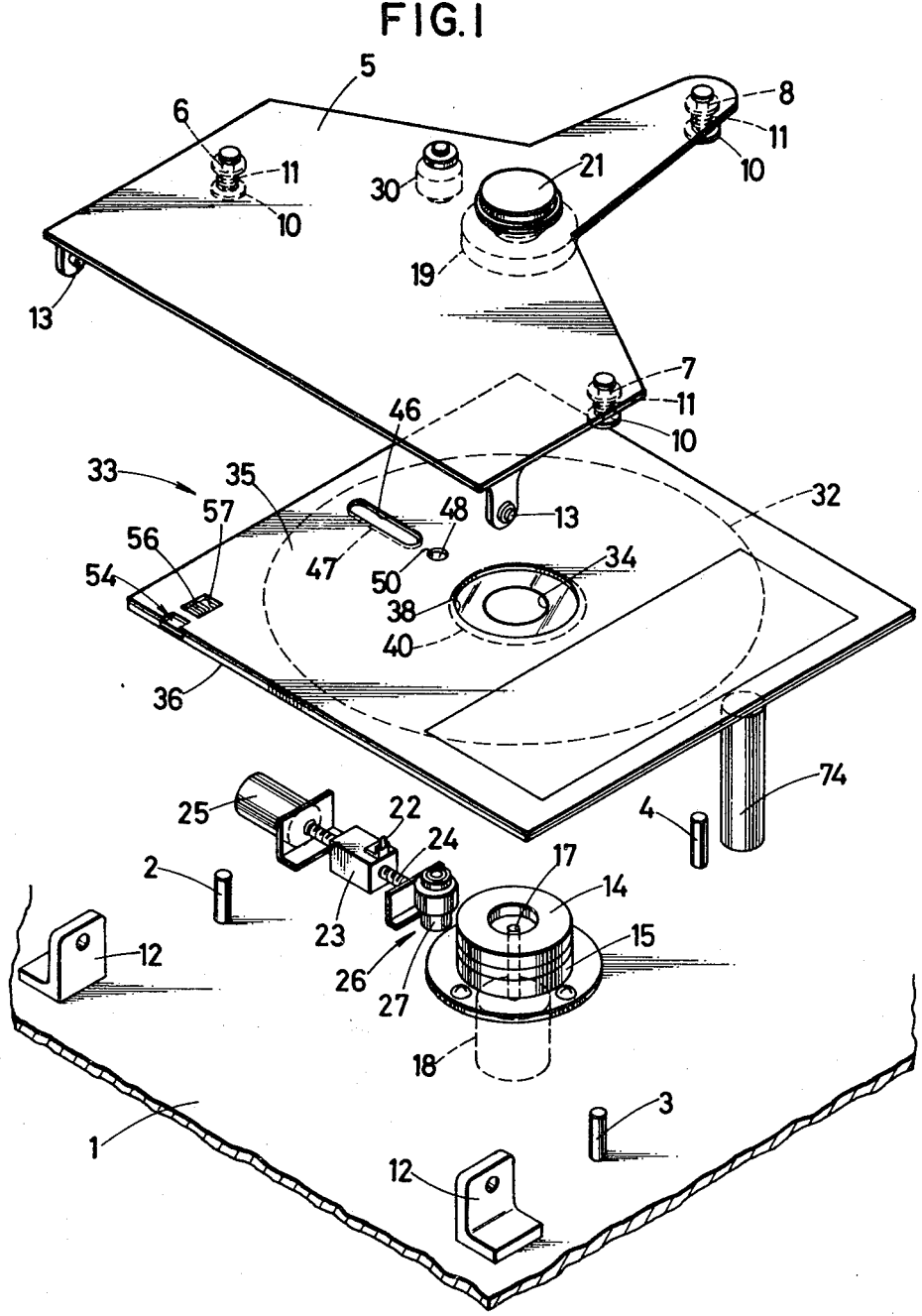
FIG. 1 is an exploded perspective view of one embodiment of an information signal recording and/or reproducing apparatus according to this invention.

Referring to the drawings in detail, and initially to FIGS. 1–4 thereof, there is shown an information signal recording and/or reproducing apparatus, that is, a video sheet recorder, according to one embodiment of this invention with which a recording jacket 33, also according to one embodiment of this invention, may be used. As shown therein, the video sheet recorder includes a main chassis 1 which is provided with three upstanding position pins 2, 3 and 4 arranged at the apices of a substantially equilateral triangle for holding and positioning the recording jacket in the recorder, with each of position pins 2, 3 and 4 being of substantially the same height. It should be appreciated that other projections, such as blocks or the like, may be used in place of pins 2, 3 and 4. A complementary sub-chassis 5 is also provided and is hingedly or rotatably supported at one end thereof by support pins 13 rotatably mounted in upstanding support arms 12 on main chassis 1. A stay or spacer post 74 may be provided, when necessary, at the other end of main chassis 1 to provide a predetermined separation distance between main chassis 1 and sub-chassis 5 whereby sub-chassis 5 is maintained in a horizontal position, that is, parallel to main chassis 1, when closed.

Figure 3:
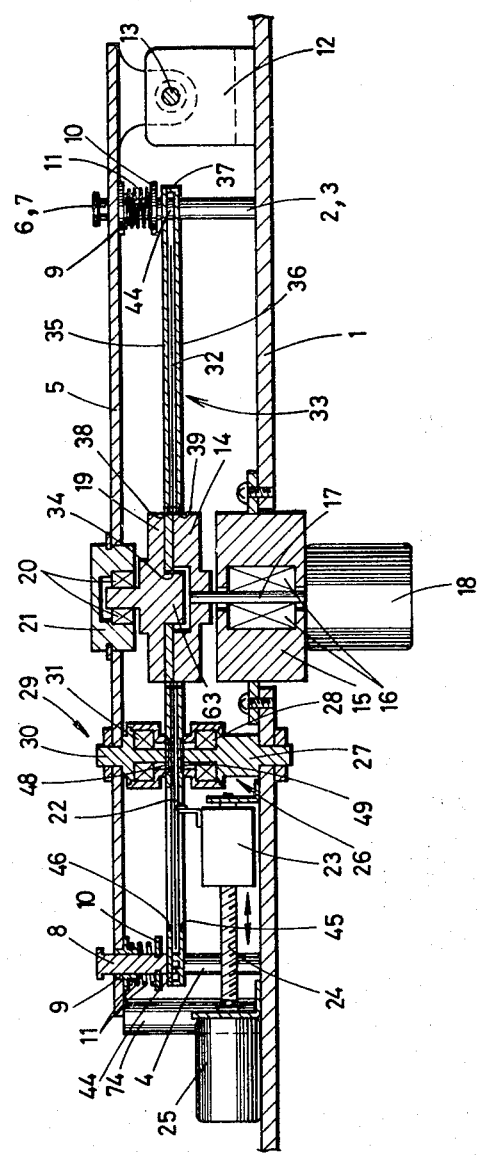
FIG. 3 is a vertical cross-sectional view of the apparatus of FIG. 1.

Three pins 6, 7 and 8 (or blocks or the like) corresponding to position pins 2, 3 and 4, respectively, are supported in sub-chassis 5 for slidable movement in the vertical, or up and down, direction by respective sleeves 9 provided in apertures in sub-chassis 5, and each pin is downwardly biased by a compression coil spring 11 disposed between a respective sleeve 9 and a ring 10 secured to the lower end of each pin, as shown in FIG. 3. In this manner, recording jacket 33 is elastically held from above and below between pins 2, 3 and 4 and respective pins 6, 7 and 8. In other words, pin 8 is downwardly biased to secure recording jacket 33 between it and corresponding pin 4. Pins 2 and 6 and pins 3 and 7 cooperate in like manner.

Main chassis 1 is also provided with a lower chuck 14 arranged substantially in the center of the triangle formed by pins 2, 3 and 4 for supporting and rotating a magnetic sheet 32 disposed in recording jacket 33. Lower chuck 14 is disposed above a bearing case 15 fixed to main chassis 1 and is secured to the upper end of a drive shaft 17 rotatably supported by a bearing 16 in bearing case 15. The lower end of drive shaft 17 is secured to a motor 18 which rotates drive shaft 17, and consequently, lower chuck 14. A complementary upper chuck 19 is mounted on sub-chassis 5 in opposing relation to lower chuck 14 and is rotatably supported by a bearing 20 which is held in a bearing case 21 fixed to sub-chassis 5.

A transducer, such as magnetic head 22, is mounted on top of a movable block 23 so as to project upwardly therefrom and is adapted to record and/or reproduce signals from magnetic sheet 32 as it contacts such sheet. Movable block 23 has a longitudinal bore through which passes a feed screw 24 which, in turn, is connected directly to a motor 25 on main chassis 1. It should be appreciated that movable block 23 and consequently, magnetic head 22, are adapted to move or be transferred by means of feed screw 24 in the lengthwise direction of feed screw 24 by rotation of motor 25, whereby magnetic head 22 contacts different portions of magnetic sheet 32 to record and/or reproduce signals therefrom.

Main chassis 1 is further provided with holding means including a lower electromagnet 26 having a yoke 27 fixed to main chassis 1 and a coil 28 wound about the center portion of yoke 27. An upper electromagnet 29 is arranged in opposing relation to lower electromagnet 28 and includes a yoke 30 fixed to sub-chassis 5 with a coil 31 being wound upon the center portion of yoke 30.

Figure 5:
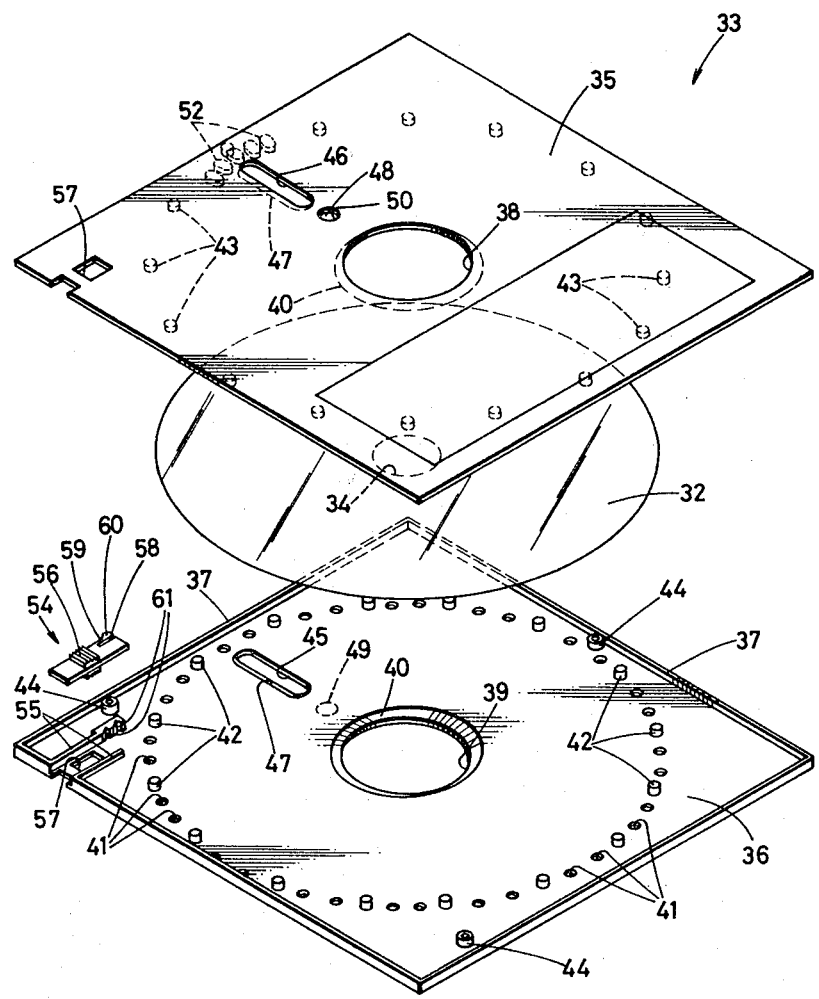
FIG. 5 is an exploded, perspective view of one embodiment of a recording jacket for accommodating a magnetic sheet according to this invention and which is adapted to be used in the apparatus of FIG. 1.
Figure 6:
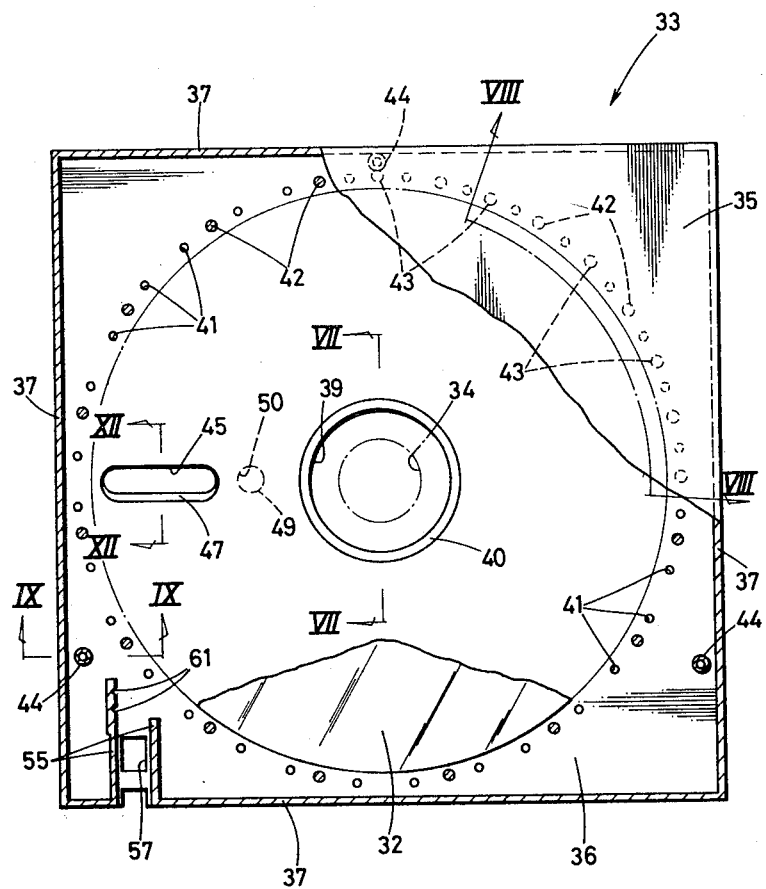
FIG. 6 is a top plan view of the recording jacket of FIG. 5 with the upper plate thereof partially cut away.

Referring now to FIGS. 5 and 6, a detailed description of the magnetic sheet 32 constituting the magnetic recording medium and one embodiment of jacket 33 according to this invention for accommodating magnetic sheet 32 will now be given. Preferably, magnetic sheet 32 is composed of a thin polymer film disc having a thickness of, for example, 0.04 mm, and is provided with a magnetic layer on at least one surface of the disc and with which magnetic head 22 moves in contact. A circular opening 34 is also provided at the center of the magnetic sheet or disc when rotating the same, as will hereinafter be discussed.

The recording jacket 33 for accommodating magnetic sheet 32 is preferably of a flat rectangular shape, as shown in FIG. 5, and is composed of an upper plate 35 and a lower plate 36 arranged in substantially parallel relation. Both upper plate 35 and lower plate 36 may be molded or formed with a synthetic resin and at least one of them, for example, lower plate 36, is preferably provided with an integral peripheral wall 37 so as to completely enclose recording sheet 32 sandwiched between upper plate 35 and lower plate 36.

Further, upper and lower plates 35 and 36 are provided at center portions thereof with openings 38 and 39, respectively, through which upper chuck 19 and lower chuck 14, respectively, are inserted into jacket 33. In this manner, upper chuck 19 and lower chuck 14 engage and secure the center portion of magnetic sheet 32 therebetween so that magnetic sheet 32 rotates with lower chuck 14, the latter, in turn, being rotated by motor 18. Openings 38 and 39 also serve as air inlets for the introduction of air into recording jacket 33 by means of centrifugal force caused by rotation of recording sheet 32 within jacket 33. In this manner, an air cushion or layer is formed on both sides of recording sheet 32 in jacket 33 so that recording sheet 32 rotates without coming into contact with the inner surfaces of upper plate 35 and lower plate 36, that is, an air damping effect results in the axial direction of magnetic recording sheet 32. However, in order to effect the smooth introduction of air into jacket 33, the peripheral wall surfaces of openings 38 and 39 are chamfered or tapered to form surfaces 40 (FIG. 7) which are inclined outwardly towards the inside of jacket 33. Furthermore, either of upper plate 35 or lower plate 36 is provided with a plurality of air outlets 41 (FIG. 5) along the outer circumference of the area covered by magnetic recording sheet 32 for discharging the air introduced into jacket 33 through openings 38 and 39.

In order to control the radial position of magnetic recording sheet 32 in recording jacket 33 so as to prevent any deviation or biased arrangement of magnetic recording sheet 32 therein, between each successive pair of outlets 41 in lower plate 36, a columnar projection 42 (FIG. 5) is integrally formed on the inner surface of lower plate 36 and is constructed so that the upper surface thereof contacts the opposing inner surface of upper plate 35. In like manner and for the same reason, upper plate 35 is provided with projections 43 integrally formed on the inner surface thereof along the periphery of recording sheet 32. Projections 43 are arranged so as to be positioned alternately with, that is, between, projections 42 and are constructed so that their bottom surfaces come into contact with the opposing surface of lower plate 36. It should be appreciated thus that projections 42 and 43 provide for a smooth recording and reproduction operation when recording jacket 33 is mounted in the recording and/or reproducing apparatus since magnetic recording sheet 32 is not bitten between projections 42 or 43 and upper plate 35 or lower plate 36, respectively. This is because lower and upper projections 42 and 43 are respectively integrally formed on lower and upper plates 36 and 35 and the upper surfaces thereof are in contact with the opposing inner surfaces of upper and lower plates 35 and 36, respectively. Thus, recording sheet 32 is centrally positioned within jacket 33 with no deviation and is free to rotate therein.

Figure 9:
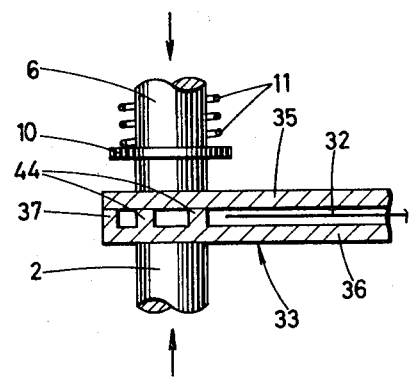
FIG. 9 is a cross-sectional view of a portion of the recording jacket of FIG. 6, taken along line IX—IX thereof, and showing the relationship thereof to position pins of the apparatus.
Figure 10:
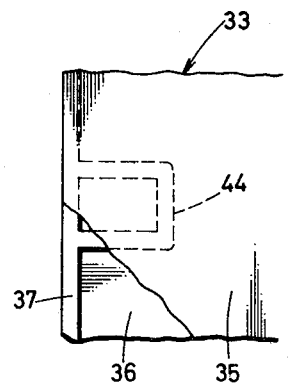
FIG. 10 is a plan view of a portion of the recording jacket of FIG. 5, illustrating a modification of a spacer thereof.
Figure 11:
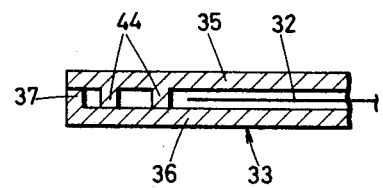
FIG. 11 is a cross-sectional view of a portion of the recording jacket of FIG. 5, illustrating another modification of the spacers thereof.

Referring to FIGS. 5, 6 and 9, a plurality of tubular spacers 44, for example, three, may be formed integrally on lower plate 36 outside the area covered by magnetic recording sheet 32 and are constructed so that the upper surfaces thereof contact the opposing inner surface of upper plate 35. Similar spacers 44 (FIG. 11) may also be or may alternatively be provided on upper plate 35 in substantially the same manner as the spacers 44 formed on lower plate 36. Spacers 44 are arranged at positions corresponding to position pins 2, 3 and 4 formed on main chassis 1 and position pins 6, 7 and 8 formed on sub-chassis 5, respectively, so as to prevent upper plate 35 and/or lower plate 36 from deforming when jacket 33 is positioned in and elastically secured between position pins 2, 3, 4 and pins 6, 7, 8, respectively, as shown in FIG. 9. In this manner, a constant space is maintained between upper plate 35 and lower plate 36 as a result of spacers 44 bearing the forces from pins 2, 3, 4 and pins 6, 7, 8, respectively. It should be appreciated, however, that other forms of spacers 44 may be provided other than those discussed above. For example, spacers 44 may be integrally formed on side wall 37 of lower plate 36, as shown in FIG. 10.

Figure 12:
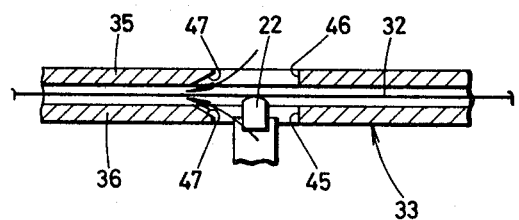
FIG. 12 is a cross-sectional view of a portion of the recording jacket of FIG. 6, taken along lines XII—XII thereof.

In order for magnetic head 22 to record and/or reproduce from recording sheet 32, lower plate 36 is also provided with a head insertion opening 45 in the form of a slit disposed in the radial direction of magnetic recording sheet 32 through which magnetic head 22 is inserted, as shown in FIGS. 5 and 6, whereby magnetic head 22 is brought into contact with rotating magnetic sheet 32 in jacket 33. A slit-like opening 46 of substantially the same size and shape as head insertion opening 45 is also formed in upper plate 35 at a position opposing head insertion opening 45 in order to compensate for any inbalance of air pressure produced by the single formation of head insertion opening 45. For example, if only head insertion opening 45 is provided, a negative pressure on the upper surface of magnetic recording sheet 32 tends to push the magnetic sheet upwardly, resulting in poor contact with magnetic head 22. Even further, in an extreme case, magnetic head 22 may not even contact recording sheet 32. Accordingly, by providing slit-like opening 46 in upper plate 35, the air pressures at the upper and lower surfaces of magnetic recording sheet 32 are equalized, thus preventing an upward pressure which acts to raise recording sheet 32 out of contact with magnetic head 22. It should be appreciated that the introduction of air into jacket 33 through openings 45 and 46 results from rotation of magnetic recording sheet 32. Accordingly, as in the case of openings 38 and 39, previously discussed, in order to provide for smooth introduction of air into jacket 33, either or both of openings 45 and 46 may be chamfered or tapered, for example, along one side thereof, to form one-sided surfaces 47 which are inclined outwardly towards the inside of jacket 33, as shown in FIG. 12.

Figure 24:
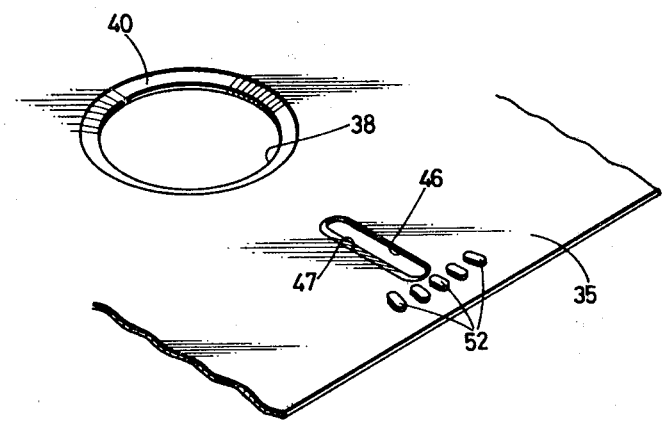
FIG. 24 is a perspective view of a portion of the inner side of the upper plate of the recording jacket of FIG. 5, illustrating projections for pressing against the peripheral portion of the magnetic sheet.
Figure 25:
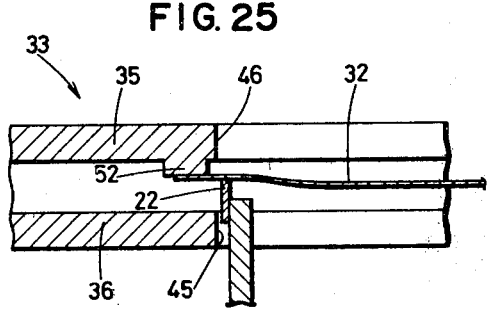
FIG. 25 is a cross-sectional view of a portion of the recording jacket of FIG. 24, illustrating the condition in which the magnetic sheet is pressed against the projections.
Figure 26:
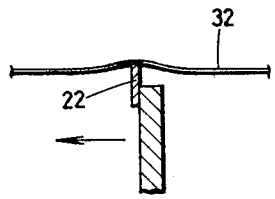
FIG. 26 is a schematic cross-sectional view of the magnetic head of the apparatus of FIG. 1, illustrating the contact relationship between the magnetic sheet and the magnet head.
Figure 27:
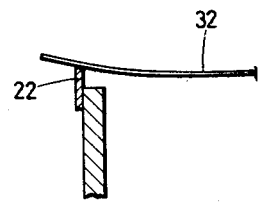
FIG. 27 is a schematic cross-sectional view of the magnetic head of the apparatus of FIG. 1, illustrating the contact relationship between the magnetic head and the magnetic sheet at the peripheral portion of the latter.
Figure 28:
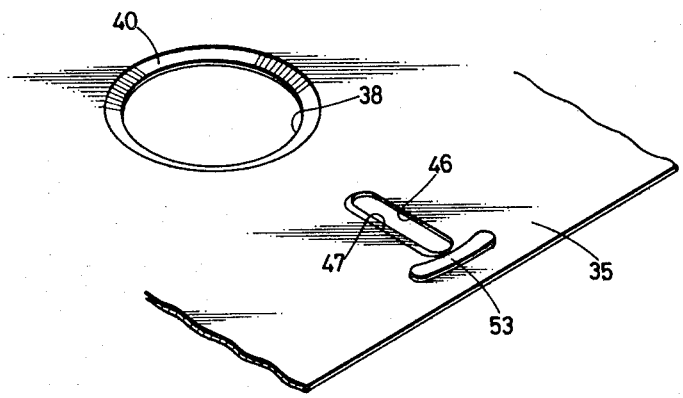
FIG. 28 is a perspective view of a portion of the inner side of the upper plate of the recording jacket of FIG. 5, illustrating a modification of the projections of FIG. 24.

Referring now to FIGS. 5 and 24, it is seen that upper plate 35 of jacket 33 has integrally formed thereon a plurality of projections, for example, five projections 52, on its inner surface at the radially outward side of slit-like opening 46 of jacket 33. Projections 52 are provided to prevent the raising of magnetic recording sheet 32 by magnetic head 22 whereupon poor contact may result with a consequent deterioration in the recording and/or reproduction of information signals. For example, when magnetic head 22 comes into contact with magnetic recording sheet 32 at a portion nearer to the center thereof, as shown in FIG. 26, the outer circumference of recording sheet 32 is not raised and the magnetic recording sheet is brought into contact with magnetic head 22 by means of the contact pressure produced by the central force of magnetic head 22. However, when magnetic head 22 contacts magnetic recording sheet 32 at a position nearer to the periphery thereof, as shown in FIG. 27, the peripheral portion of magnetic recording sheet 32 is raised whereby a lack of contact pressure between magnetic head 22 and recording medium 32 may result. Accordingly, projections 52 serve to oppose the raising of such peripheral portion to any great extent, as shown in FIG. 25. It should be appreciated, however, that the number and dimensions of projections 52 may vary. For example, a single projection 53 extending in the circumferential direction of magnetic recording sheet 32 may be provided on the inner or lower surface of upper plate 35 at the same location as the previously-discussed projections 52, as shown in FIG. 28.

In rotating the recording sheet 32 within its jacket 33 during a recording or reproducing operation, a problem often arises with the rotating sheet 32 contacting the inner surfaces of jacket 33. In order to further overcome this problem, upper plate 35 and lower plate 36 are respectively provided with small iron or ferromagnetic pieces 48 and 49 which are situated, for example, at a radial inward position of magnetic recording sheet 32 with respect to slit-like opening 46 and head insertion opening 45 of jacket 33, as shown in FIGS. 5 and 6. Iron pieces 48 and 49 are fixedly mounted by an adhesive resin 51 inside circular grooves 50 formed on the outer surfaces of the respective upper and lower plates 35 and 36, as shown in FIGS. 13 and 14. However, iron pieces 48 and 49 are constructed so that the upper surfaces thereof are below the outer surfaces of the respective upper and lower plates 35 and 36 when mounted in circular grooves 50.

Iron pieces 48 and 49 are designed to maintain a constant distance between upper plate 35 and lower plate 36 by cooperating with upper electromagnet 29 and lower electromagnet 26, previously discussed, and which are mounted on sub-chassis 5 and main chassis 1, respectively. In other words, when jacket 33 is mounted in the apparatus of FIG. 1, electromagnets 26 and 29 magnetically attract iron pieces 49 and 48, respectively. Since the outer diameters of yokes 27 and 30 of electromagnets 26 and 29 are greater than the outer diameters of grooves 50 (and of iron pieces 49 and 48, respectively) and since the upper surfaces of iron pieces 48 and 49 are designed to be below the outer surfaces of upper plate 35 and lower plate 36 of jacket 33, yokes 27 and 30 only contact the outer surfaces of upper plate 35 and lower plate 36. In this manner, a substantially fixed distance is maintained between upper plate 35 and lower plate 36 (and in the space therebetween). Thus, such factors as the thickness or distortion of iron pieces 48 and 49, the amount and exudation of the adhesive resin 51, and the like, do not adversely affect the substantially fixed distance maintained between upper plate 35 and lower plate 36 since yokes 30 and 27 of respective electromagnets 29 and 26 do not contact the outer surfaces of iron pieces 48 and 49. Furthermore, as shown in FIG. 15, the diameter $d_1$ of the gap portion of yokes 30 and 27 of the respective electromagnets 29 and 26 is designed to be smaller than the diameter $d_2$ of iron pieces 48 and 49 so as to close the magnetic path whereby the recording and reproducing of information signals from magnetic sheet 32 is not adversely affected by such magnetic flux.

Figure 16:
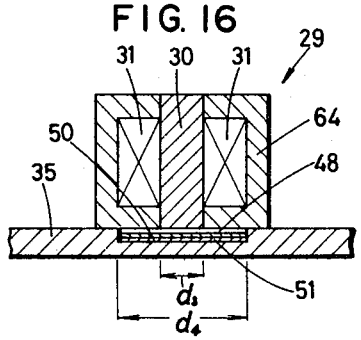
FIG. 16 is an enlarged, cross-sectional view of another embodiment of a magnet used for holding the top plate of the jacket in a fixed position.
Figure 17:
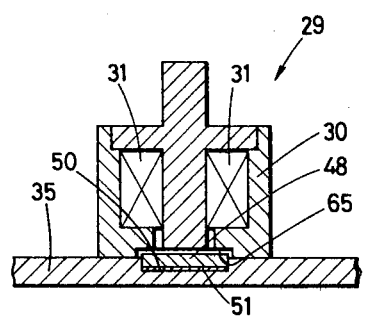
FIG. 17 is an enlarged cross-sectional view of another embodiment of a magnet used for holding the top plate of the jacket in a fixed position.
Figure 18:
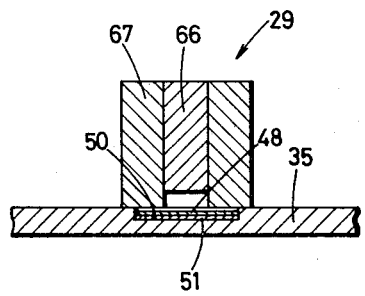
FIG. 18 is an enlarged, cross-sectional view of another embodiment of a magnet used for hodling the top plate of the jacket in a fixed position.

It should be appreciated that electromagnets 26 and 29 are not restricted to the particular structure and shape shown in FIGS. 14 and 15. For example, electromagnets 26 and 29 may be of an open pole type, as shown in FIG. 16, in which coil 31 is wound about the outer circumference of yoke 30, in the form of a pole, and the outer circumference of coil 31 is then covered with a non-magnetic material, such as a resin layer 64. In such case, it is preferable that the diameter $d_3$ of yoke 30 be smaller than the diameter $d_4$ of iron plate 48 so as to prevent any leakage of magnetic flux that would adversely affect the recording and reproduction of information signals from recording sheet 32, as previously discussed in regard to the embodiment of FIGS. 14 and 15. Alternatively, iron piece 48 (and 49) may extend above the surface of upper plate 35 (lower plate 36). In such case, a central groove 65 is provided on yoke 30 to receive iron piece 48 without contacting the same, as shown in FIG. 17. In this latter embodiment, it should be appreciated that iron piece 48 may be mounted directly on the outer surface of upper plate 35 of jacket 33 so that groove 50 may be eliminated while also enabling the lower end portion of yoke 30 to be brought into direct contact with the upper surface of upper plate 35 of jacket 33. In another embodiment, as shown in FIG. 18, a permanent magnet 66 is used in place of electromagnet 29 to magnetically attract iron piece 48 through an external yoke 67 of permanent magnet 66.

Further, it should be appreciated that although one one ferromagnetic or iron piece 48 and 49 has been provided at a radial inward position with respect to slit-like opening 46 and head insertion opening 45, respectively, other formations may be used. For example, three ferromagnetic pieces 48 and three ferromagnetic pieces 49 may be provided respectively equally spaced from each other along circumferential paths of upper plate 35 and lower plate 36, as shown in FIG. 19. In such case, three electromagnets 26 and three electromagnets 29 would necessarily have to be provided. In another embodiment, an attracting plate 68 of a ferromagnetic material may be adhered to or integrally molded peripherally about slit-like opening 46 and head insertion opening 45, as shown in FIGS. 20 and 21, in place of iron pieces 48 and 49, so as to coact with respective electromagnets in the apparatus of FIG. 1. Thus, attracting plate 68 can provide a constant or substantially fixed distance between upper plate 35 and lower plate 36 while, at the same time, providing a reinforcing construction for jacket 33. This construction can further improve the dimensional accuracy of the peripheral portions of slit-like opening 46 and head insertion opening 45 and can further provide for the effective prevention of magnetic or electrostatic noise.

Figure 22:
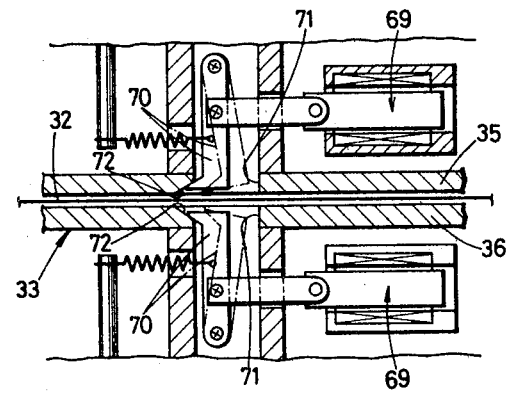
FIG. 22 is a cross-sectional view of a portion of a recording jacket and information signal recording and/or reproducing apparatus according to another embodiment of this invention, illustrating mechanical means for holding the upper and lower plates of the jacket a substantially fixed distance apart.
Figure 23:
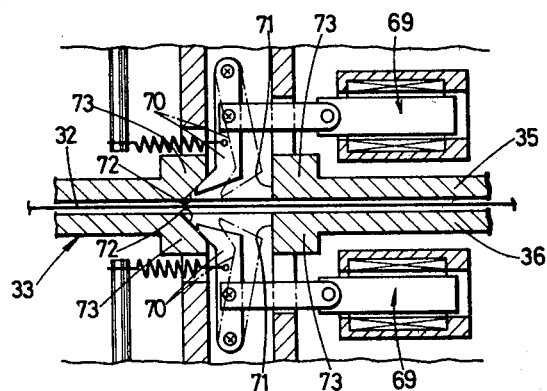
FIG. 23 is a cross-sectional view of a portion of a recording jacket and information signal recording and/or reproducing apparatus according to another embodiment of this invention, illustrating a modification of the mechanical holding means of FIG. 22.

Although various magnetic holding means have been described above, a mechanical holding means may be provided in place of the magnetic holding means in order to provide a constant space between upper plate 35 and lower plate 36 of jacket 33. The mechanical holding means may, for example, include a plunger 69 and claw 70 pivotally mounted on and angularly displaceable by plunger 69 for each of upper plate 35 and lower plate 36, as shown in FIG. 22. Claws 70 are designed to hitch or catch onto inclined surfaces 72 at respective openings 71 in upper plate 35 and lower plate 36. In such case, the thickness of upper plate 35 and lower plate 36 at the peripheral portions of openings 71 may be increased by providing ribs 73 around such peripheral portions so as to ensure that claws 70 engage the inclined surfaces 72, as shown in FIG. 23.

As shown in FIGS. 5 and 6, jacket 33 is further provided with a slidable member or slider 54 supported between upper plate 35 and lower plate 36 for preventing inadvertent erasure of the information signals from recording sheet 32. Slider 54 is slidably guided by a pair of sliding ribs 55 formed on lower plate 36 of the jacket, as shown in FIGS. 29 and 30. Operating portions 56 of a zig-zag configuration are formed on both sides of slider 54 and are exposed through openings 57 in upper and lower plates 35 and 36 in order that slider 54 can be operated from the outside of jacket 33. Alternatively, a circular hole 62, as shown in FIG. 31, may be provided in place of operating portions 56 to operate slider 54 from the outside. The slider 54 is also provided integrally with an elongated elastic piece 59 extending from the main portion of slider 54 and separated therefrom by a slit 58, and having a projection 60 at the tip portion thereof. One of ribs 55 is extended and is provided with two grooves 61 adapted to communicate with projection 60 so that projection 60 can selectively engage either of grooves 61 during the sliding operation of slider 54. Thus, a mechanism (not shown) in the apparatus of FIG. 1 may be operated, depending on the position of slider 54, to prevent inadvertent erasure, to change over trackings, and the like.

Figure 4:
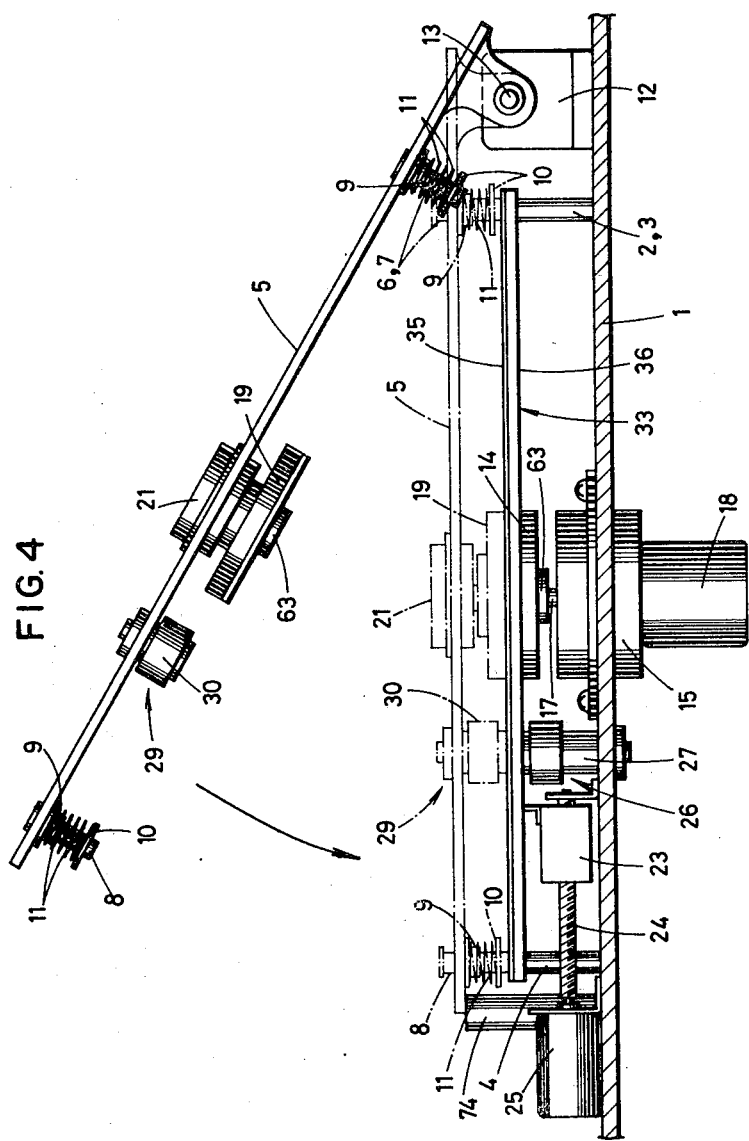
FIG. 4 is a side elevational view of the apparatus of FIG. 1 with the sub-chassis thereof shown in its opened position.

The operation of the apparatus of FIG. 1 and recording jacket 33 of FIG. 5, according to one embodiment of this invention, will now be described. As shown in FIG. 4, sub-chassis 5 is initially angularly displaced about support pins 13 so that jacket 33 accommodating magnetic sheet 32 can be positioned therein on position pins 2, 3 and 4 of main chassis 1. Although not shown, it should be appreciated that the apparatus of FIG. 4 is designed to control the position of jacket 33 in the planar direction, that is, the longitudinal and lateral directions, by an appropriate positioning means (not shown). Sub-chassis 5 is then closed to the position represented by dot-dashed lines in FIG. 4 (see also FIG. 3), whereby pins 6, 7 and 8 mounted on sub-chassis 5 elastically press down upon the upper surface of jacket 33 through coil springs 11 so as to secure jacket 33 between pins 2,6; 3,7; and 4,8. In this manner, the height of jacket 33 is also controlled by lower pins 2, 3 and 4 and upper pins 6, 7 and 8 while, at the same time, the space inside jacket 33 at such points is maintained substantially constant without any deformation thereat as a result of spacers 44 being integrally provided on lower plate 36 of the jacket at positions corresponding to position pins 2, 3, 4 and 6, 7, 8.

Figure 8:
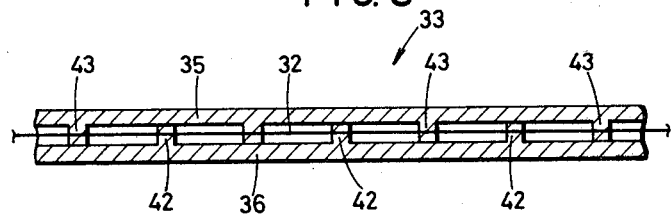
FIG. 8 is a cross-sectional view of the recording jacket of FIG. 6, taken along line VIII—VIII thereof.

As shown in FIGS. 5 and 8, the outer circumference of magnetic recording sheet 32 in jacket 33 has its position controlled by means of projections 42 and 43 alternately arranged on lower and upper plates 36 and 35, respectively. Thus, center spindle 63 (FIG. 3) of upper chuck 19 is adapted to correctly enter circular opening 34 of magnetic recording sheet 32 when upper and lower chucks 19 and 14 are respectively inserted into openings 38 and 39 in jacket 13 during the closing of sub-chassis 5, as shown in FIGS. 3 and 4. In this manner, magnetic recording sheet 32 is held between upper and lower chucks 19 and 14 in a correct position for recording and/or reproducing and is adapted to be rotated, for example, at 1800 rpm or 3600 rpm, by motor 18 through upper chuck 19 and lower chuck 14. Further, since projections 42 and 43 are alternatively provided on lower plate 36 and upper plate 35, respectively, so as to contact the opposing inner surfaces of upper plate 35 and lower plate 36, respectively, the outer circumferential portion of magnetic recording sheet 32 is not pinched between projections 42 and 43 and upper plate 35 and lower plate 36, respectively, whereby the rotation of recording sheet 32 is not hindered.

Further, when jacket 33 is mounted in the apparatus of FIG. 4, electromagnets 26 and 29 respectively magnetically attract iron pieces 49 and 48, as shown in FIG. 14, whereby upper plate 35 is magnetically drawn upwardly and lower plate 36 is magnetically drawn downwardly. Since iron pieces 48 and 49 are provided at positions on upper plate 35 and lower plate 36, respectively, so as to be disposed below the outer surfaces of plates 35 and 36, respectively, as shown in FIG. 13, the end portions of yokes 27 and 30 of respective electromagnets 26 and 29 are brought into contact with the outer surfaces of lower plate 36 and upper plate 35. In this manner, a constant or substantially fixed space between upper and lower plates 35 and 36 is provided so as to further provide a constant or substantially fixed height or space for accommodating magnetic recording sheet 32 in jacket 33. Such construction also effectively prevents any distortion or warping of jacket 33 and therefore, does not require any great improvement in the accuracy or precision of construction of the jacket, thereby reducing the costs for jacket manufacture.

Figure 7:
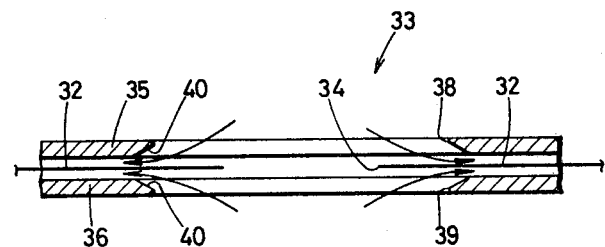
FIG. 7 is a cross-sectional view of the recording jacket of FIG. 6, taken along line VII—VII thereof.

After jacket 33 is mounted in the apparatus of FIG. 3, as described above, motor 18 is rotated, thereby driving magnetic recording sheet 32 held between upper chuck 19 and lower chuck 14 at, for example, 1,800 rpm or 3,600 rpm. Because of such rotation, air is introduced into jacket 33 through center openings 38 and 39 thereof, and is transferred outwardly in the radial direction of magnetic recording sheet 32 by means of centrifugal force and discharged through air outlets 41. Thus, magnetic recording sheet 32 is smoothly rotated without coming into contact with upper plate 35 and lower plate 36 as a result of the creation of air layers between upper plate 35 and the upper surface of magnetic recording sheet 32 and between lower plate 36 and the lower surface of magnetic recording sheet 32. This effect is further enhanced by the smooth introduction of air into jacket 33 by means of the inclined surfaces 40 of center openings 38 and 39 of jacket 33, as shown in FIG. 7.

Air is also introduced into jacket 33, by rotation of magnetic recording sheet 32, from head insertion opening 45 and slit-like opening 46. In order to effect the smooth introduction of air through openings 45 and 46, the outer circumferential portions thereof are formed as inclined surfaces 47, as shown in FIG. 12. Thus, magnetic recording sheet 32 is not subjected to even partial distortion in the axial direction of rotation because air pressure at the upper and lower surfaces thereof are equal, corresponding to the positions of slit-like opening 46 and head insertion opening 45. Thus, magnetic recording sheet 32 has its height correctly positioned with respect to the surface of the magnetic head, that is, it is equally spaced from upper plate 35 and lower plate 36 by means of air damping layers in jacket 33 when mounted in the apparatus of FIG. 1 and rotated at a high speed.

Figure 2:
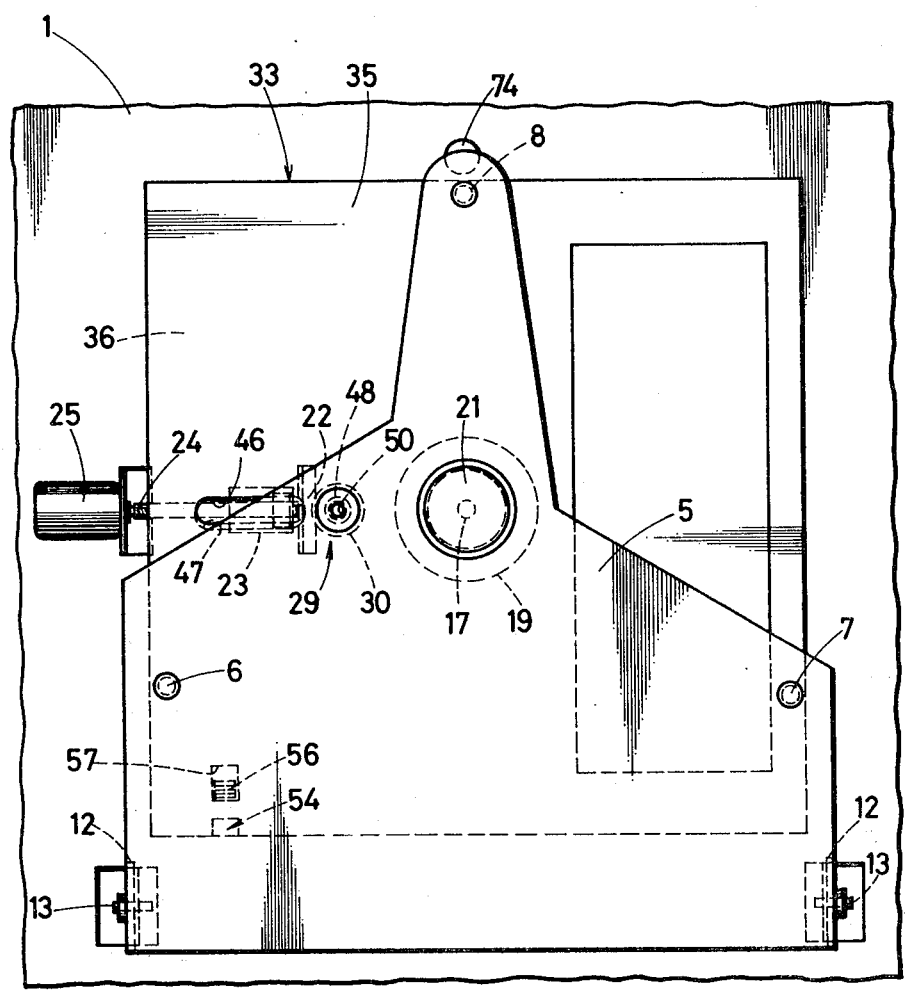
FIG. 2 is a top plan view of the apparatus of FIG. 1.

Magnetic head 22 is then inserted through head insertion opening 45 in lower plate 36 of jacket 33 and is brought into contact with magnetic recording sheet 32 which is rotating at a high speed so as to record and/or reproduce information signals therefrom. At this time, a motor 25, as shown in FIGS. 1–3, is driven to transfer movable block 23 by means of feed screw 24 in the radial direction of magnetic recording sheet 32, whereby magnetic head 22 is transferred outwardly in the radial direction of the magnetic sheet so as to scan spiral tracks on magnetic recording sheet 32. This results in the centrifugal force being lessened at the outer circumferential portion of magnetic recording sheet 32 so as to cause this portion to be raised upwardly, as shown in FIG. 27. In order to prevent this phenomenon, projections 52 are provided on the inner surface of upper plate 35 in an outwardly radial position of magnetic recording sheet 32 with respect to head insertion opening 45, thereby pressing downwardly on the outer circumferential portion of the magnetic recording sheet. Thus, magnetic head 22 always maintains an appropriate contact pressure with magnetic recording sheet 32. With this operation, magnetic head 22 can scan the magnetic recording sheet to effect the desired recording and/or reproduction of information signals therefrom.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A jacket for positioning a recording sheet in an information signal recording and/or reproducing apparatus of the type including holding means, comprising:
   an upper plate having a peripheral portion;
   a lower plate having a peripheral portion and cooperating with said upper plate for sandwiching said recording sheet between said upper plate and said lower plate;
   a peripheral wall enclosing the peripheral portions of the upper and lower plates; and
   positioning means located on at least one of said upper and lower plates and adapted to cooperate with said holding means so that said holding means pulls at least said one of said upper plate and said lower plate in a direction away from the other for maintaining said upper plate and said lower plate a substantially fixed distance apart during operation of said apparatus with said jacket and recording sheet positioned therein.

2. The jacket according to claim 1; in which said positioning means includes first magnet means on at least one of said upper and lower plates adapted to cooperate with holding means in said apparatus for maintaining said upper plate and said lower plate a substantially fixed distance apart.

3. The jacket according to claim 2; in which said first magnet means includes at least one ferromagnetic member mounted on at least one of said upper and lower plates and said holding means includes second magnet means for magnetically attracting said at least one ferromagnetic member so as to maintain said upper plate and said lower plate a substantially fixed distance apart.

4. The jacket according to claim 3; in which said first magnet means includes a first ferromagnetic member mounted on said upper plate and a second ferromagnetic member mounted on said lower plate, and said second magnet means includes a first magnet for magnetically attracting said first ferromagnetic member away from said recording sheet and a second magnet for magnetically attracting said second ferromagnetic member away from said recording sheet in a direction opposite to the direction of attraction of said first magnet.

5. The jacket according to claim 4; in which said first and second magnets are one of electromagnets and permanent magnets.

6. The jacket according to claim 3; in which at least one of said upper and lower plates on which said at least one ferromagnetic member is mounted includes at least one groove, with each groove being adapted to mount a respective ferromagnetic member therein and with each ferromagnetic member having an upper surface which lies below the outer surface of the respective upper and lower plates when mounted in its respective groove.

7. The jacket according to claim 3; in which each said ferromagnetic member is mounted on the outer surface of one of said upper and lower plates, and said second magnet means includes at least one magnet, each magnet corresponding to a respective ferromagnetic member and each magnet having a grooved portion in which said respective ferromagnetic member is disposed when magnetically attracted by said magnet, wherein said respective ferromagnetic member does not contact said magnet.

8. The jacket according to claim 3; further including an opening in one of said upper and lower plates for insertion of transducer means into said jacket to transduce an information signal with respect to said recording sheet, and in which said at least one ferromagnetic member is mounted on said one of said upper and lower plates so as to extend about the periphery of said opening.

9. The jacket according to claim 1; in which said positioning means includes engaging means on at least one of said upper and lower plates adapted to cooperate with holding means in said apparatus for maintaining said upper plate and said lower plate a substantially fixed distance apart.

10. The jacket according to claim 9; in which said engaging means includes at least one engaging surface on at least one of said upper and lower plates and said holding means includes at least one claw-like member for engaging said at least one engaging surface so as to maintain said upper plate and said lower plate a substantially fixed distance apart.

11. The jacket according to claim 10; in which said engaging means includes a first inclined engaging surface on said upper plate and a second inclined engaging surface on said lower plate, and said holding means includes a first claw-like member adapted to engage said first inclined engaging surface for pulling said upper plate away from said recording sheet and a second claw-like member adapted to engage said second inclined engaging surface for pulling said lower plate away from said recording sheet in a direction opposite to the direction of pull of said first claw-like member.

12. The jacket according to claim 1; in which said positioning means further includes at least one spacer member attached to the inner surface of at least one of said upper and lower plates for maintaining said upper plate and said lower plate a substantially fixed distance apart.

13. The jacket according to claim 12; in which said apparatus includes a first upper set of position pins and a second lower set of position pins for securing said jacket therebetween with said first upper set engaging said upper plate at different positions and said second lower set engaging said lower plate at positions corresponding to said different positions, and said positioning means includes a set of spacer members attached to the inner surface of at least one of said upper and lower plates at positions corresponding to said different positions for preventing deformation of said upper and lower plates when said jacket is secured between said first upper set of position pins and said second lower set of position pins.

14. The jacket according to claim 1; further including a head insertion opening in one of said upper and lower plates, said apparatus including transducer means adapted to be inserted through said head insertion opening for communicating with said recording sheet, and a second opening in the other of said upper and lower plates at a position opposing said head insertion opening for providing an air pressure balance to both sides of said recording sheet.

15. The jacket according to claim 14; further including air outlets in at least one of said upper and lower plates for discharging air introduced through said head insertion opening and said second opening.

16. The jacket according to claim 1; in which said positioning means includes a central opening in each of said upper and lower plates for providing an air pressure balance to both sides of said recording sheet.

17. The jacket according to claim 16; further including air outlets in at least one of said upper and lower plates for discharging air introduced through said central openings.

18. The jacket according to claim 16; in which said apparatus includes an upper chuck and a lower chuck adapted to be inserted through said central openings of said upper plate and said lower plate, respectively, for engaging and rotating said recording sheet therebetween.

19. A jacket for positioning a recording sheet having an outer circumferential portion in an information signal recording and/or reproducing apparatus of the type including transducer means for reproducing an information signal recorded on said recording sheet, comprising:
an upper plate;
a lower plate cooperating with said upper plate for sandwiching said recording sheet between said upper plate and said lower plate;
positioning means on at least one of said upper and lower plates for maintaining said upper plate and said lower plate a substantially fixed distance apart;
a head insertion opening in one of said upper and lower plates through which said transducer means is adapted to be inserted for communicating with said recording sheet; and
projection means on the inner surface of the other of said upper and lower plates at a position substantially opposite to said head insertion opening and radially in line therewith for contacting said recording sheet at the outer circumferential portion thereof to ensure contact between said transducer means and said recording sheet at the outer circumferential portion of said recording sheet.

20. A jacket for positioning a recording sheet having a circular configuration in an information signal recording and/or reproducing apparatus, comprising:
an upper plate having an inner surface;
a lower plate having an inner surface and cooperating with said upper plate for sandwiching said recording sheet between said upper plate and said lower plate; and
positioning means located on at least one of said upper and lower plates for maintaining said upper plate and said lower plate a substantially fixed distance apart at least during rotation of said recording sheet between said upper plate and said lower plate and for controlling the radial position of said recording sheet in said jacket, said positioning means including upper projections attached to the inner surface of said upper plate and extending into contact with the inner surface of said lower plate about a circumference defining the outer periphery of said circular recording sheet and lower projections attached to the inner surface of said lower plate and extending into contact with the inner surface of said upper plate about said circumference and between said upper projections.

21. An information signal recording and/or reproducing apparatus for reproducing an information signal recorded on a recording sheet, said recording sheet being positioned within said apparatus by a jacket having an upper plate and a lower plate cooperating with said upper plate for sandwiching said recording sheet therebetween, said apparatus comprising:
transducer means for reproducing an information signal recorded on said recording sheet;
drive means for providing relative movement between said recording sheet and said transducer means; and
holding means cooperating with positioning means located on at least one of said upper and lower plates for pulling said at least one of said upper plate and said lower plate in a direction away from the other to maintain said upper plate and said lower plate a substantially uniform fixed distance apart during operation of said apparatus with said jacket and recording sheet positioned therein.

22. The jacket according to claim 21; in which said positioning means includes engaging means on at least one of said upper and lower plates adapted to cooperate with said holding means in said apparatus for maintaining said upper plate and said lower plate a substantially fixed distance apart.

23. An information signal recording and/or reproducing apparatus for reproducing an information signal recorded on a recording sheet, said recording sheet being positioned within said apparatus by a jacket having an upper plate and a lower plate cooperating with said upper plate for sandwiching said recording sheet therebetween, said apparatus comprising:

transducer means for reproducing an information signal recorded on said recording sheet;

drive means for providing relative movement between said recording sheet and said transducer means; and holding means cooperating with positioning means located on at least one of said upper and lower plates for pulling said at least one of said upper plate and said lower plates in a direction away from the other to maintain said upper plate and said lower plate a substantially fixed distance apart during operation of said apparatus with said jacket and recording sheet positioned therein, said positioning means including engaging means having at least one engaging surface on at least one of said upper and lower plates and said holding means having at least one claw-like member for engaging said at least one engaging surface so as to maintain said upper plate and said lower plate a substantially fixed distance apart.

24. The jacket according to claim 23; in which said engaging means includes a first inclined engaging surface on said upper plate and a second inclined engaging surface on said lower plate, and said holding means includes a first claw-like member adapted to engage said first inclined engaging surface for pulling said upper plate away from said recording sheet and a second claw-like member adapted to engage said second inclined engaging surface for pulling said lower plate away from said recording sheet in a direction opposite to the direction of pull of said first claw-like member.

25. An information signal recording and/or reproducing apparatus for reproducing an information signal recorded on a recording sheet, said recording sheet being positioned within said apparatus by a jacket having an upper plate and a lower plate cooperating with said upper plate for sandwiching said recording sheet therebetween, said apparatus comprising:

transducer means for reproducing an information signal recorded on said recording sheet;

drive means for providing relative movement between said recording sheet and said transducer means; and holding means cooperating with positioning means located on at least one of said upper and lower plates for pulling said at least one of said upper plate and said lower plates in a direction away from the other to maintain said upper plate and said lower plate a substantially fixed distance apart during operation of said apparatus with said jacket and recording sheet positioned therein, said positioning means including at least one ferromagnetic member mounted on at least one of said upper and lower plates and said holding means including magnet means for magnetically attracting said at least one ferromagnetic member so as to maintain said upper plate and said lower plate a substantially fixed distance apart.

26. The jacket according to claim 25; in which said positioning means includes a first ferromagnetic member mounted on said upper plate and a second ferromagnetic member mounted on said lower plate, and said magnet means includes a first magnet for magnetically attracting said first ferromagnetic member away from said recording sheet and a second magnet for magnetically attracting said second ferromagnetic member away from said recording sheet in a direction opposite to the direction of attraction of said first magnetic.

27. The jacket according to claim 26; in which said first and second magnets are one of electromagnets and permanent magnets.

28. The jacket according to claim 25; in which at least one of said upper and lower plates on which said at least one ferromagnetic member is mounted includes at least one groove, with each groove being adapted to mount a respective ferromagnetic member therein and with each ferromagnetic member having an upper surface which lies below the outer surface of the respective upper and lower plates when mounted in its respective groove.

29. The jacket according to claim 25; in which each said ferromagnetic member is mounted on the outer surface of one of said upper and lower plates, and said magnet means includes at least one magnet, each magnet corresponding to a respective ferromagnetic member and each magnet having a grooved portion in which said respective ferromagnetic member is disposed when magnetically attracted by said magnet, wherein said respective ferromagnetic member does not contact said magnet.

30. The jacket according to claim 25; further including an opening in one of said upper and lower plates for insertion of said transducer means into said jacket to transduce said information signal with respect to said recording sheet, and in which said at least one ferromagnetic member is mounted on said one of said upper and lower plates so as to extend about the periphery of said opening.

31. A jacket for positioning a recording sheet having a circular configuration in an information signal recording and/or reproducing apparatus of the type including holding means and transducer means for reproducing an information signal recorded on said recording sheet, comprising:

an upper plate having an inner surface;

a lower plate having an inner surface and cooperating with said upper plate for sandwiching said recording sheet between said upper plate and said lower plate; and positioning means located on at least one of said upper and lower plates for maintaining said upper plate and said lower plate a substantially fixed distance apart during operation of said apparatus with said jacket and recording sheet positioned therein, said positioning means including first means adapted to cooperate with said holding means so that said holding means pulls said at least one of said upper plate and said lower plate in a direction away from the other, upper projections attached to the inner surface of said upper plate and extending into contact with the inner surface of said lower plate about a circumference defining the outer periphery of said circular recording sheet and lower projections attached to the inner surface of said lower plate and extending into contact with the inner surface of said upper plate about said circumference and between said upper projections to also control the radial position of said recording sheet in said jacket, a first head insertion opening located in one of said upper and lower plates, a second opening located in the other of said upper and lower plates opposite to said first opening, at least one of said first and second openings having a peripheral edge portion which forms a surface outwardly inclined towards said recording sheet to also provide for the smooth introduction of air into said jacket, and projection means on the inner surface of the other of said upper and lower plates at a position substantially opposite to said head insertion opening for ensuring contact between said transducer means and said recording sheet at the outer circumferential portion of said recording sheet.

* * * * *